E. N. MOOR.
UNIVERSAL DIVIDING ATTACHMENT FOR LATHES.
APPLICATION FILED MAY 29, 1918.
1,311,455.
Patented July 29, 1919.
2 SHEETS—SHEET 1.
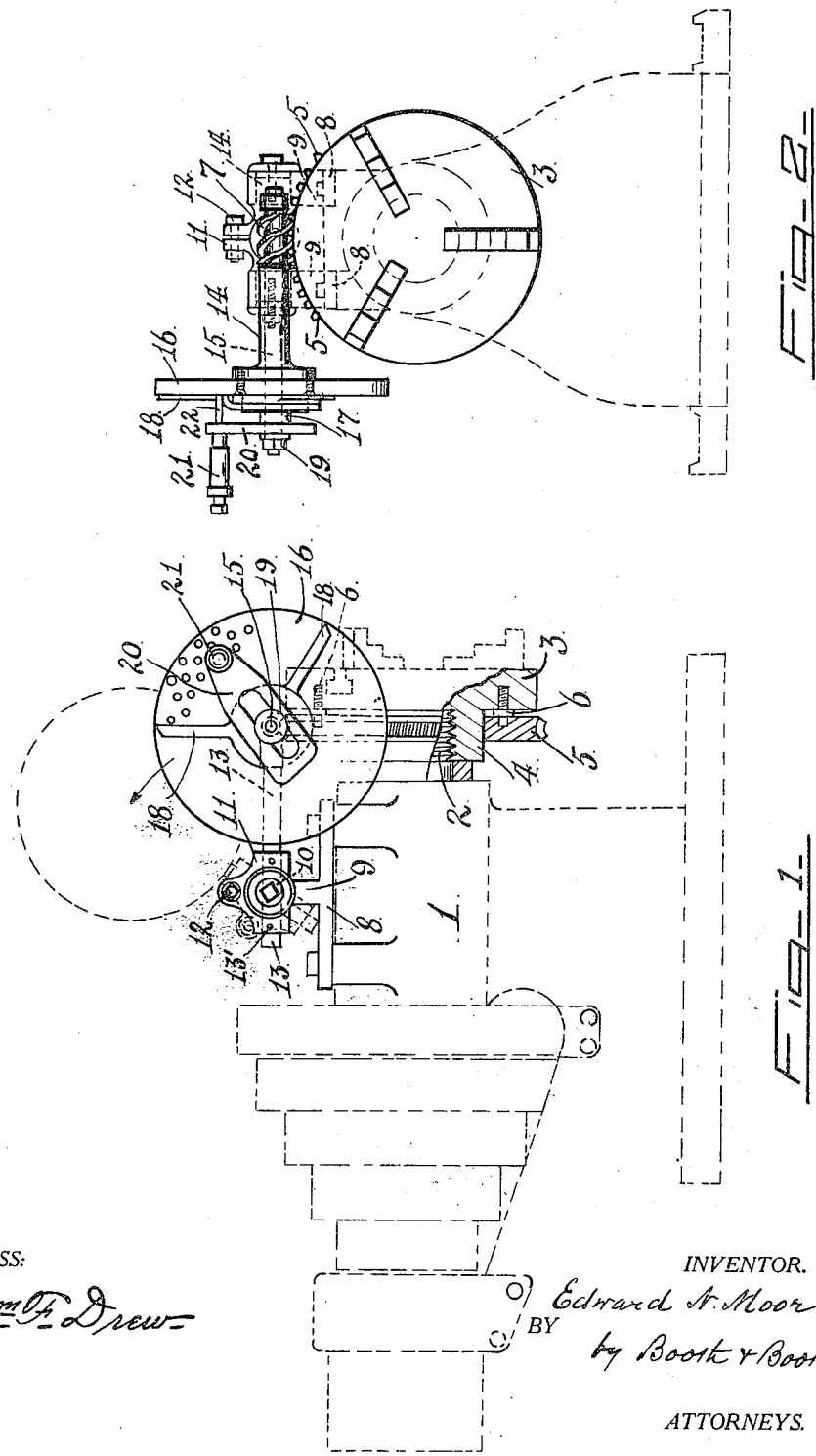
WITNESS:
Wm F. Drew
INVENTOR.
Edward N. Moor
BY
Booth & Booth
ATTORNEYS.

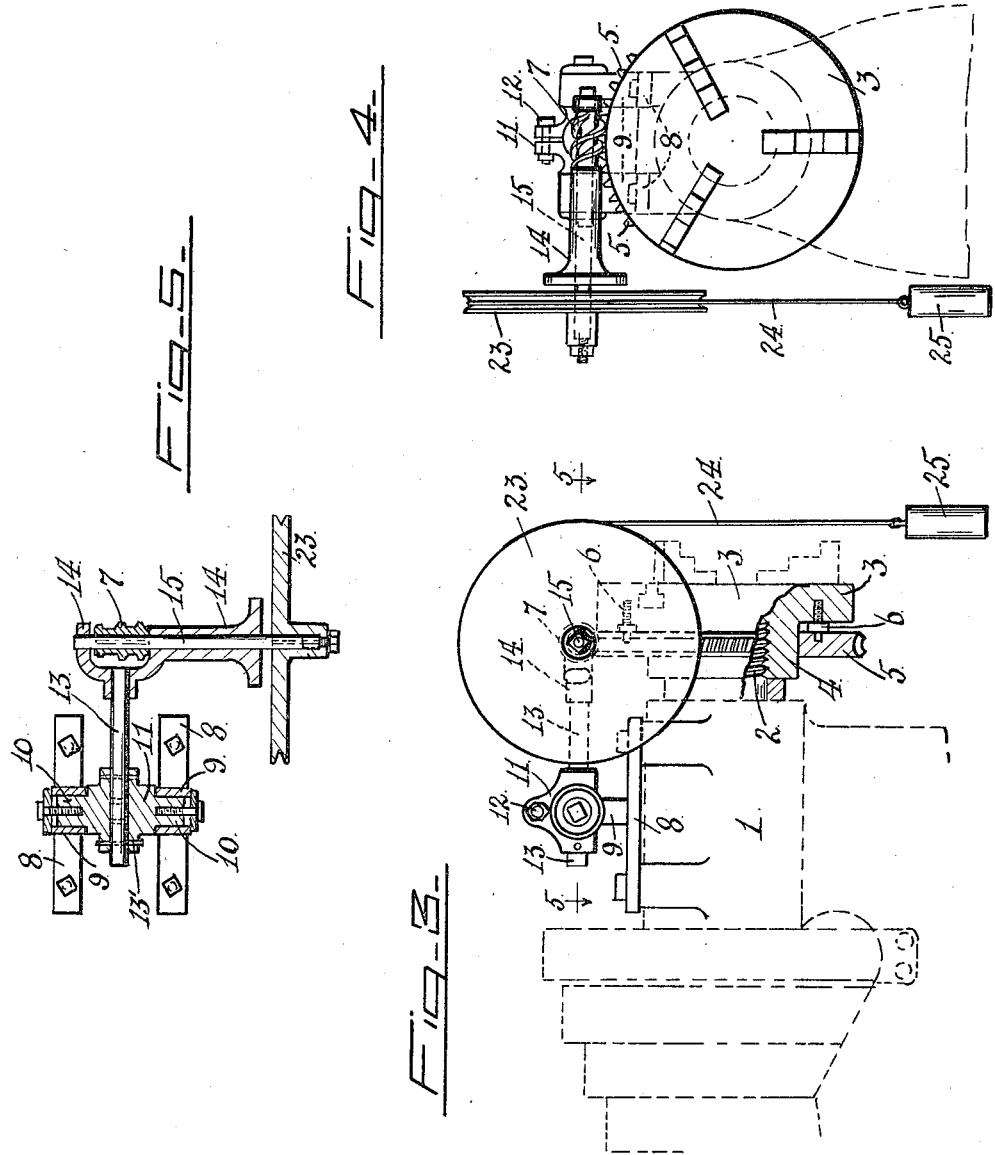

UNITED STATES PATENT OFFICE.

EDWARD N. MOOR, OF OAKLAND, CALIFORNIA.

UNIVERSAL DIVIDING ATTACHMENT FOR LATHES.

1,311,455.   Specification of Letters Patent.   Patented July 29, 1919.

Application filed May 29, 1918. Serial No. 237,316.

*To all whom it may concern:*

Be it known that I, EDWARD N. MOOR, a citizen of the United States, residing at Oakland, in the county of Alameda and State of California, have invented certain new and useful Improvements in Universal Dividing Attachments for Lathes, of which the following is a specification.

My invention relates to lathe attachments and especially to a device, which from its nature and functions may appropriately be termed a universal dividing attachment. The object of my invention is to provide a device for this purpose adapted for ready and convenient attachment and application to standard milling machines and lathes, said attachment by slight modification being also adapted for use as an automatic circular feeding device.

My invention consists in the novel device for the purposes mentioned, which I shall now fully describe by reference to the accompanying drawings, in which—

Figure 1 is a front elevation of my attachment.

Fig. 2 is an end view of the same.

Fig. 3 is a front view of the attachment as modified for an automatic circular feed.

Fig. 4 is an end view of the same.

Fig. 5 is a section on line 5—5 of Fig. 3.

1 is the head stock and 2 is the head stock spindle of a lathe. 3 is a face plate, here shown as a chuck fitted to the spindle. Slipped upon the sleeve 4 of the chuck 3 is a worm wheel 5, which is held in position and united to the body of the chuck by the lag-studs 6. This worm-wheel has 80 teeth but in order to preserve the standard ratio, which practice has set at 40 to 1, the worm 7 which engages the worm wheel has a duplex thread as shown in Figs. 2 and 4 so that each revolution of the worm moves the worm wheel two teeth, thus giving the ratio of 40 to 1 as is usual. The worm wheel 5 being a separate piece, united with the chuck simply by slipping it on the chuck sleeve and setting up the lag-studs, is adapted to be thus fitted and applied to different chucks, the latter being standard, with no peculiarity of structure, such, for example, as making the worm wheel integral with the chuck rim.

Fastened to the front bearing cap of the lathe spindle journal are the plates 8, in the standards 9 of which is journaled by trunnions 10, Fig. 5, a rocking clamp 11, having a controlling bolt 12. Fitted slidably in this clamp and adapted for longitudinal adjustment therein by means of a locating pin 13' is an arm 13 which carries at its front end a fork 14, as seen in Figs. 2 and 5. In this fork is journaled a shaft 15 which carries the worm 7. On the end of the fork 14 is fixed the dividing plate 16, on the hub of which is frictionally mounted the counting stop 18 adapted to play over the face of the plate.

Mounted on the end of the worm shaft 15 and clamped against a shoulder 17 thereof by a nut 19 is the index arm 20 having a handle 21 and a pin 22, Fig. 2 which latter is adapted to be fitted in any of the holes in the dividing plate 16. The index arm 20 is slotted over the worm shaft 15, as seen in Fig. 1, whereby it may be adjusted radially to cause its pin 22 to engage any of the annular rows of holes in the dividing plate.

It will now be seen that by the rocking of the clamp 11, the arm 13 may be swung down from the dotted position shown in Fig. 1 to carry the worm 7 into mesh with the worm wheel 5, and also that by means of the locating pin 13' which may fit in different holes in the arm 13, the latter may be adjusted longitudinally to cause the worm to accurately register with the worm wheel in whatever position the latter may be in the assemblage, according to whatever face plate or chuck it may be associated with.

Now when the worm and worm wheel are in mesh and the head stock spindle of the lathe and the chuck it carries are thrown out of gear so that they are free to rotate, the index arm 20 may be turned to rotate the worm shaft 15 and thus cause the worm 7 to rotate the worm wheel 5 which being attached to the chuck will rotate the latter and the work it carries to the desired position. This position is, as usual, defined by the previous setting of the counting-stop 18 in proper relation to a given hole in the dividing plate, and the index arm will move around until stopped by the previously set counting-stop.

Thus the work may be divided independent of the lathe itself, and the attachment may be fitted to any standard lathe or milling machine. By its use, the feed of the work held on the chuck can be controlled, and a circular hand fed milling chuck can be used in conjunction with a horizontal cutting tool used in a mill or grinder.

In Figs. 4 and 5 I show the attachment slightly modified as applicable for making automatically a circular feed of the work.

In this case the dividing plate and its adjuncts are removed, and a pulley 23 is placed on the worm shaft 15. Around this pulley is wound a cord 24 suspending a weight 25. The worm gearing drives and holds the chucked work automatically up to the cutting tool working against the same, thus making an automatic circular feeding device as applied to a lathe. This adaptation of the device is due to the arrangement by which the engagement of the worm 7 is with the top of the worm-wheel 5, thus enabling the worm shaft 15 to extend horizontally and to carry the pulley 23 in a vertical plane, so that the weight 25 will hang by its cord 24 perpendicularly. This top arrangement of the device is also more convenient both in application to the lathe, and in throwing it up out of the way and down to operative position.

I claim:—

1. A lathe attachment for the described purpose comprising a worm-wheel with means for attaching it to the chuck or face-plate carried by the head stock spindle of the lathe; a worm-spindle engaging said worm-wheel to turn the chuck or face plate; a swinging arm mounted on the lathe and carrying the worm spindle, whereby the latter may be thrown into and out of engagement with the worm-wheel; means for longitudinally adjusting said arm to effect the accurate engagement of the worm spindle with the worm wheel; and means for turning said worm spindle.

2. A lathe attachment for the described purpose comprising a worm-wheel with means for removably attaching it to the chuck or face plate carried by the headstock spindle of the lathe; a horizontal worm-spindle adapted for engagement with the top of said worm-wheel; a swinging arm mounted on the lathe and carrying the worm-spindle for thowing the latter into and out of engagement with the worm wheel; means for longitudinally adjusting said arm to effect the accurate engagement of the worm spindle with the worm wheel; and means for turning the worm spindle.

In testimony whereof I have signed my name to this specification in the presence of two subscribing witnesses.

EDWARD N. MOOR.

Witnesses:
WM. F. BOOTH,
D. B. RICHARDS.

Copies of this patent may be obtained for five cents each, by addressing the "Commissioner of Patents, Washington, D. C."